(12) United States Patent  
Bernstein et al.

(10) Patent No.: US 8,310,926 B1  
(45) Date of Patent: Nov. 13, 2012

(54) MODEM COUNT BASED LOAD BALANCING IN A CABLE NETWORK

(75) Inventors: Alon S. Bernstein, Sunnyvale, CA (US); Gitesh Shah, San Jose, CA (US); Cindy Chan, San Jose, CA (US); Hui Sun, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 12/708,313

(22) Filed: Feb. 18, 2010

(51) Int. Cl.
*G08C 15/00* (2006.01)
(52) U.S. Cl. .................. 370/230; 370/437; 370/468
(58) Field of Classification Search .......... 370/229–235, 370/437, 465, 468
See application file for complete search history.

(56) References Cited

U.S. PATENT DOCUMENTS

2005/0002331 A1* 1/2005 Nolle et al. .................. 370/229

OTHER PUBLICATIONS

Cable Labs, DOCSIS 3.0 Section 11.6 (CableLabs CM-SP-MULPIv3.0-I08-080522), May 22, 2008.

* cited by examiner

*Primary Examiner* — Pao Sinkantarakorn
(74) *Attorney, Agent, or Firm* — Leon R. Turkevich (57) ABSTRACT

Load balancing across RF channels in a cable plant is challenging where individual cable modems have multiple receive/transmit channels. Load balancing may be taken into account in the assignments of channels to requesting modems in a registration process. Requesting modems may be registered in a sequence of descending order defined by the number of channels requested. Channel sets may be selected to minimize a maximum delta metric of load balancing. It is preferred to normalize the "weight" of a modem on a channel based on the modem capabilities. The relative weight may be inversely related to the number of channels supported by the modem. Load balancing techniques disclosed may be applied to both upstream and downstream channels. Current load balance quality is estimated and reported to an operator.

18 Claims, 5 Drawing Sheets

FIG. 1

FIG. 3
Ranking available combinations

FIG. 4

MODEM COUNT BASED LOAD BALANCING IN A CABLE NETWORK

TECHNICAL FIELD

The present disclosure relates generally to the field of cable networks, and more specifically to load balancing in cable networks to improve performance.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. Cable Television Laboratories, Inc. (CableLabs®) publishes detailed technical specifications for such systems, including DOCSIS—Data Over Cable Service Interface Specification. See, for example, CM-SP-MULPIv3.0-108-080522, hereafter referred to generally as DOCSIS 3.0.

Performance is improved by spreading or "load balancing" traffic over the available channels. In DOCSIS 2.0, load balancing was achieved by simply allocating the available channels across the modems for a given CMTS. For example, given 4 channels and 80 modems, a balanced system would allocate 20 modems per channel.

DESCRIPTION OF EXAMPLE EMBODIMENTS

Overview

A Cable Modem Termination System (CMTS) in one example provides a network interface for sending and receiving data to and from a network, RF interfaces to implement RF channels for communications between the CMTS and at least one cable modem, and registration logic for assigning selected RF channels to a requesting modem for communications between the CMTS and the modem. Further, the CMTS implements load balancing logic associated with the registration logic for selecting the RF channels to assign to a requesting modem so as to balance loading across the RF channels based on a modem count heuristic.

In one example, a processor-implemented method for load balancing in a cable network includes the following steps: receiving registration requests from a plurality of cable modems, each request including a receive channel profile for the corresponding modem; selecting a first one of the requesting modems that has the highest number of receive channels in the corresponding profile; assigning the requested number of receive channels to the selected modem consistent with that modem's receive channel profile; selecting a next one of the remaining requesting modems that has a highest number of receive channels in the corresponding profile; assigning the requested number of receive channels to the selected modem consistent with that modem's receive channel profile; and repeating the steps of selecting a next modem, and assigning receive channels to the selected modem, so that the requesting modems are registered sequentially, from those having the most channels registered first to those having the fewest channels registered last.

In another example, a processor-implemented method for load balancing across the downstream channels of a CMTS includes the steps of: receiving a registration request in a CMTS from a cable modem, the registration request including a receive channel profile indicating a number of channels available on the modem for downstream traffic flow; accessing a current channel load profile of the CMTS stored in memory, the channel load profile indicating a current number of modems per channel already assigned to each downstream channel of the CMTS; assigning downstream channels to the requesting modem consistent with the receive channel profile and selected to balance a modem count across the downstream channels of the CMTS; and updating the channel load profile of the CMTS to reflect the new channel assignments.

DESCRIPTION

In the newer DOCSIS 3.0 specifications, each modem has the potential to use several channels, and different modems may support different numbers of channels. Further, a single CM is permitted to transmit on multiple upstreams (channels), for example using "channel bonding". Channel bonding is a logical process that combines the data packets received on multiple independent channels into one higher-speed data stream. (See DOCSIS 3.0 at Chapter 8 Channel Bonding.) Channel bonding can be implemented independently on upstream channels or downstream channels. It therefore becomes difficult to count "modems per channel" for load balancing. Indeed, it is no longer clear what a modem count per channel means in the DOCSIS 3.0 environment, especially in the case of overlapping bonding channels. Thus there remains a need for improved methods and apparatus for load balancing of modem traffic across channels in a cable network.

Some embodiments may be implemented by modifications to CMTS internal operations, which in turn may be accomplished by changes to hardware, software (firmware), or a combination of the two. Several preferred examples of the present application will now be described with reference to the accompanying drawings. Various other examples of the disclosure are also possible and practical. This application may be exemplified in many different forms and should not be construed as being limited to the examples set forth herein. In one example, a CMTS is configured to intelligently assign RF channels to cable modems during a registration process, so as to balance loading across the available channels. The CMTS typically includes one or more processors, and may be so configured by software, firmware and or hardware. The multiple-channel capabilities of requesting modems, as applicable, as well as techniques like channel bonding, preferably are taken into account in the load balancing process. In an embodiment, the process employs an "effective modem count" strategy, further explained below.

The figures listed above illustrate examples of the application and operation of aspects of the disclosure. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

Figure 1:
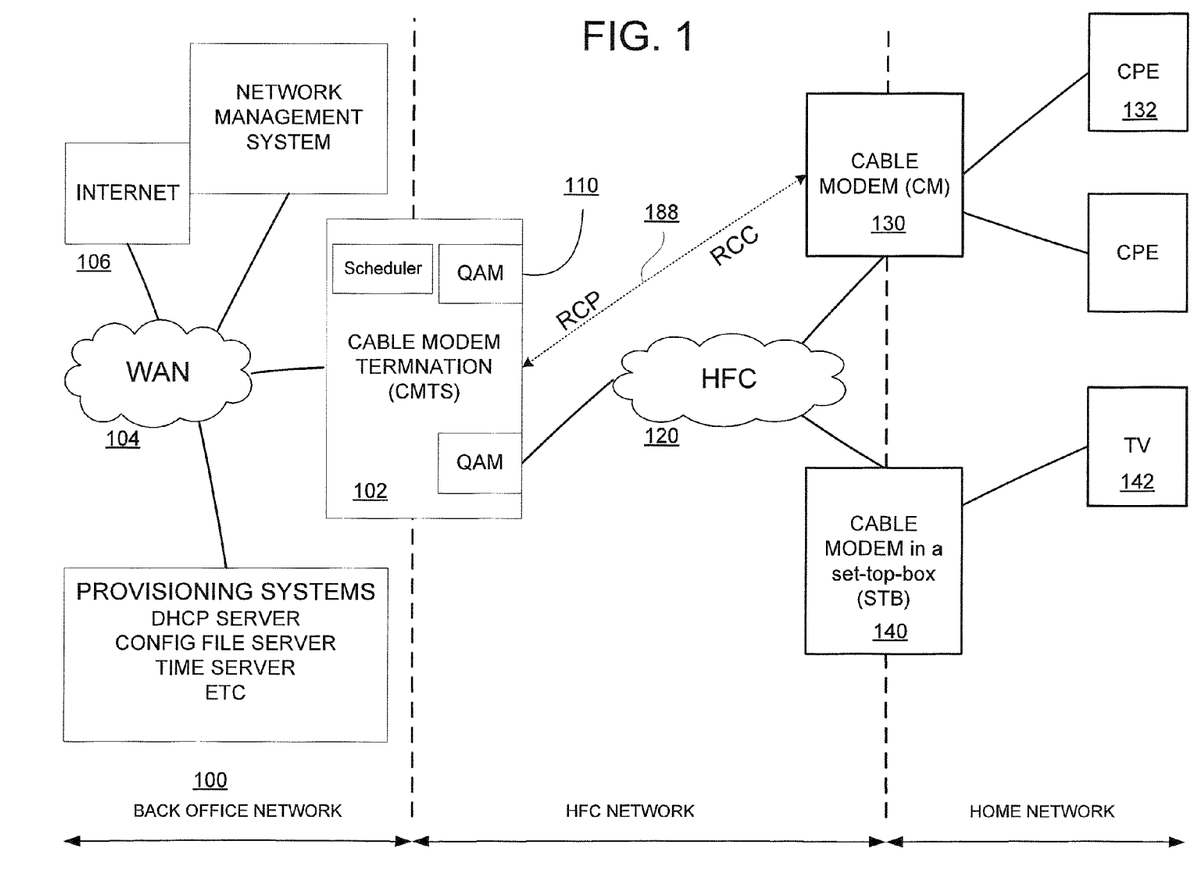
FIG. 1 is a simplified block diagram illustrating an example of a DOCSIS network.

Referring to FIG. 1, in typical cable systems 100, a Cable Modem Termination System (CMTS) 102 (or a modular CMTS called "M-CMTS") connects the cable network 104 to a data network, such as the Internet 106. (In this document, we shall refer to CMTS generically; the present disclosure is not limited to modular, integrated or other CMTS implementations.) A downstream QAM 110 receives data transferred from the CMTS over a packet switched portion of the network, performs modulation and other processing, and then transfers the modulated data over a Hybrid Fiber Coaxial (HFC) portion 120 of the cable network to subscribers. This is called the "downstream" direction.

In general, this HFC or coax cable feeds the last link (for example, over the last half mile or less) to an individual home or other structure. There, a cable modem (CM) 130 may provide a packet interface, for example Ethernet compliant, to various consumer premises equipment (CPE) 132 such as a personal computer. The CM may be connected to a hub or router (not shown), for example to implement a home network, wireless access, etc. The CM (or a second CM) may be implemented in other equipment, for example a "set-top-box" (STB) 140 which provides an interface to a television 142.

When they register with a CMTS, individual CMs are assigned to one or more of the available frequency "channels." Toward that end, in the registration process, a CM sends a Receive Channel Profile (RCP) to the CMTS, defining the attributes of each receive channel available on the CM. The CMTS subsequently communicates a Receive Channel Configuration (RCC) to the CM to configure the receive channels, including assignment of center frequencies. See 188 in FIG. 1.

Figure 2:
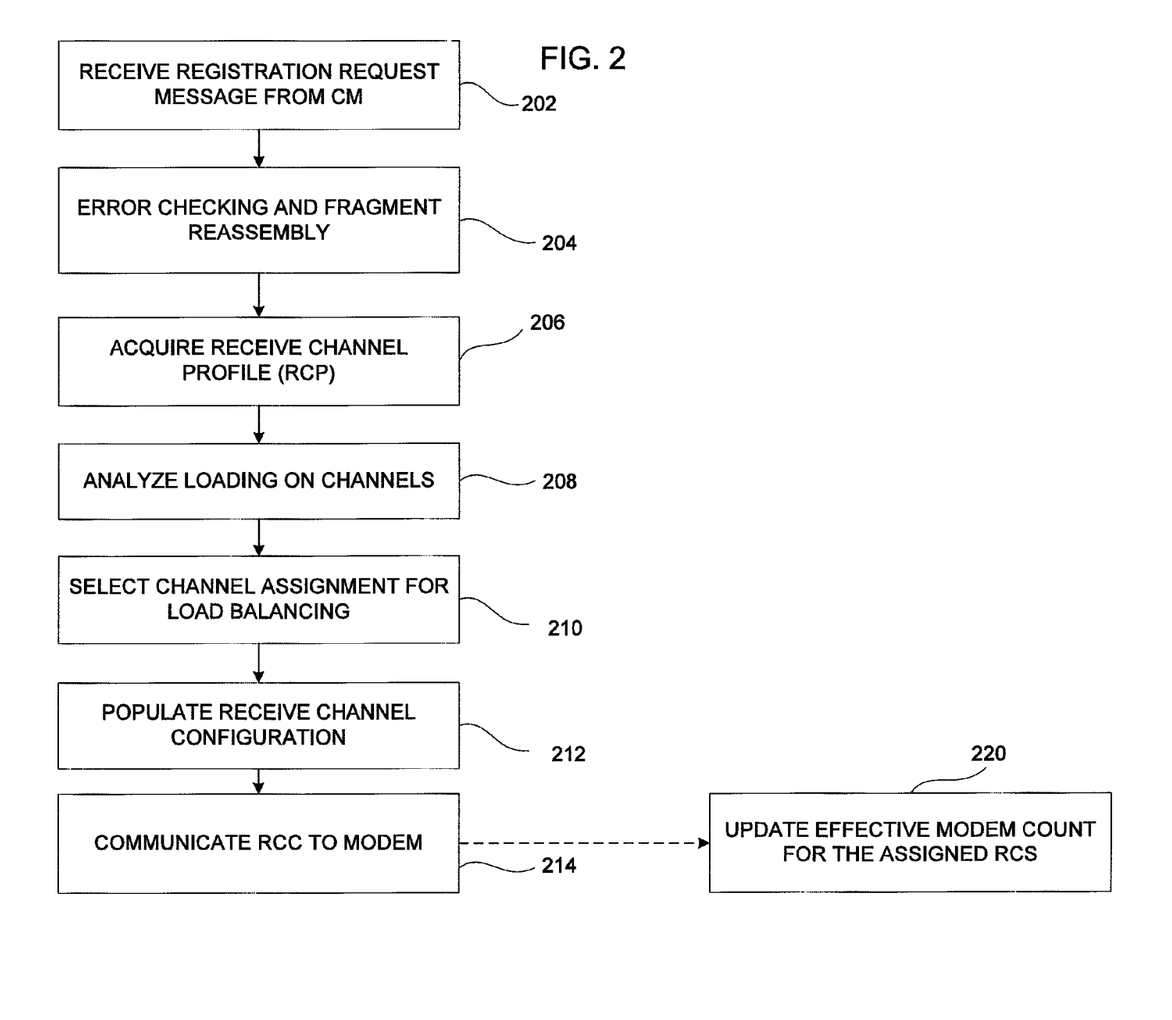
FIG. 2 is a simplified flow diagram illustrating an embodiment of a method of assigning channels to a CM so as to balance loading across available channels.

FIG. 2 provides a simplified overview flow diagram consistent with the present disclosure, as follows. A CMTS receives a registration request from a cable modem in the usual fashion, block 202. The CMTS executes error checking and fragment reassembly, block 204, as in known in prior art. The CMTS also acquires a receive channel profile RCP from the request, block 206, identifying RF capabilities of the requesting modem. Next, the CMTS (or a load balancing component) inspects the present loading on the RF channels, block 208, and then selects channel assignments for the requesting mode, consistent with the RCP, and arranged to balance loading across the channels, block 210. The CMTS populates a receive channel configuration RCC to reflect those assignments, block 212, and transmits the RCC to the requesting modem, block 214. In one preferred embodiment, the channel selection process implements a normalized modem counting heuristic further described below.

DOCSIS 3.0 "Autonomous Load Balancing" is described at Section 11.6 of the specification. Autonomous Load Balancing is a feature of the CMTS that controls dynamic changes to the set of downstream and upstream channels used by a CM. The CMTS uses the Dynamic Channel Change (DCC) message to control the load balancing of CMs not operating in Multiple Receive Channel mode. The CMTS uses the Dynamic Bonding Change (DBC) message to control load balancing of CMs operating in Multiple Receive Channel mode. With CMs operating in Multiple Receive Channel mode, load balancing can be performed by changing the Receive Channel Set of the CM, or by moving one or more service flows to different downstream channels within the current RCS of the CM.

While DOCSIS thus provides a mechanism to change channel assignments dynamically, it does not specify any methodology or policies to actually determine what changes should be made in order to balance loading. Rather, DOCSIS 3.0 states: "As in DOCSIS 2.0, the definition of "balanced" load is left to the CMTS vendor, and the algorithm by which the CMTS attempts to achieve and maintain this balance is similarly left to the CMTS vendor." See 5.2.2.3.

We have discovered methods and apparatus for achieving load balancing in a cable plant. Our "modem count based load balancing" (MCB-LB) in some embodiments leverages the law of "large numbers". The law of large numbers is a theorem in probability that describes the long-term stability of the mean of a random variable. Given a random variable with a finite expected value, if its values are repeatedly sampled, as the number of these observations increases, the sample mean will tend to approach and stay close to the expected value (the average for the population).

In a cable network, we assume that for a large enough population of modems the average amount of traffic each modem contributes is a fairly stable number and that by equally distributing modems across channels, the bandwidth utilization across the channels would also be equalized. One advantage of MCB-LB is that it's fairly static. As modems register, they are assigned to a channel, and generally there is no need to re-assign channels as traffic conditions change. For example, when a few CMs leave, the loading changes on the affected channels, but the effect is small relative to a large number of modems. And, as new modems register, the assignments will tend to re-balance the system.

Our "modem count based load balancing" (MCB-LB) concept is applicable to either (or both of) the downstream DS and upstream US channel assignments. For illustration, we describe several embodiments of the downstream load balancing case below. Details that are well known in the art are omitted in this description so as to avoid obscuring the present disclosure. Each Docsis 3.0 modem that registers to a CMTS is assigned a "receive channel set" (RCS), a set of downstream channels assigned to an individual CM. The RCS is explicitly configured by the CMTS using the Receive Channel Configuration (RCC) encodings. (RCS are not bonding groups. For example, an 8-channel cable modem might be assigned an RCS made up of channels 1, 2, 3, 4, 5, 6, 7, 8 and have three bonding groups: one that spans channels 1, 2, 3, 4, one that spans channels 5, 6, 7, 8 and one that spans 3, 4, 5, 6.)

We propose a novel "effective modem count" over the channels within a fiber node. We focus here on the RCS rather than bonding groups. Note that a DOCSIS 2.0 modem can be considered as a modem with a single-channel RCS. In order to accurately "count modems" when one or more of them register multiple channels, we defined an "effective modem count" on each one of the channels, to reflect the extent to which the channel is included in any modem RCS in the relevant CMTS MAC domain.

To illustrate, assume Channels 1-10 are available for DOCSIS modems, and that the system is registering 2 modems, each with an 8-channel RCS. In the table below, each box represents the modem count for the corresponding channel number; initially the values are all equal to 0. We call this a channel load profile.

| Channel number        | 1 | 2 | 3 | 4 | 5 | 6 | 7 | 8 | 9 | 10 |
|---|---|---|---|---|---|---|---|---|---|---|
| Effective Modem Count | 0 | 0 | 0 | 0 | 0 | 0 | 0 | 0 | 0 | 0 |

Figure 5:
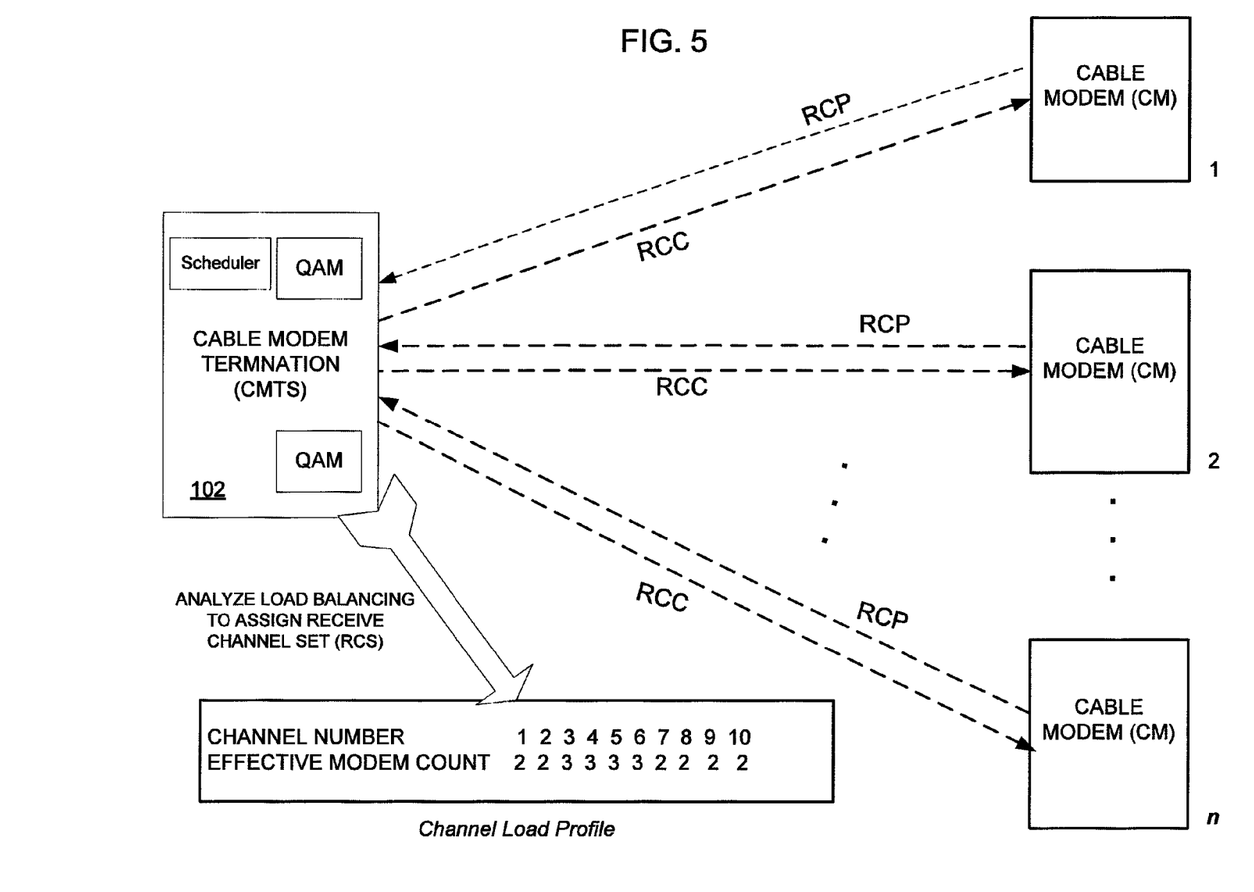
FIG. 5 a simplified block diagram illustrating the environment in which load balancing processes described herein may be performed.

FIG. 5 is a simplified block diagram illustrating the general environment in which the modem registration and load balancing processes described herein may be performed. In FIG. 5, the HFC, fiber nodes, etc. are omitted to focus on interactions between the cable modems and the CMTS. Here, cable n modems are shown for illustration, although just two modems are in the following example. Each cable modem sends its RCP to the CMTS, and the CMTS in turn transmits an RCC back to each cable modem, as further explained below, with the RCC carefully selected for load balancing. In a typical implementation, the load balancing (channel assignment) processes may be executed by processors in the CMTS and the respective cable modems, and the communications between them may be implemented over well known methods and protocols.

As the first modem registers, the CMTS can choose to assign any of the channels to the RCS for that CM. We assume for illustration only that the process may start with the lowest channel number, and assign channels sequentially. The "effective modem count" for a given channel is incremented for each modem to which the channel is assigned in the corresponding RCS. Below is the effective modem count for each channel (channel load profile) after the first modem registers:

| Channel number        | 1 | 2 | 3 | 4 | 5 | 6 | 7 | 8 | 9 | 10 |
|---|---|---|---|---|---|---|---|---|---|---|
| Effective Modem count | 1 | 1 | 1 | 1 | 1 | 1 | 1 | 1 | 0 | 0 |

As the second modem registers, the CMTS has several assignment options. In fact it has a choice of any 8 out of 10 which, based on combinatorics, equals 45. Since not all channels have the same count, the choices make a difference and a simple sequential assignment may not be optimal as the numbers become larger and the assignments more complex. Ideally the CMTS would try all the available combinations and choose which is best. To illustrate, we present only two options and see how we rank them as "best" or "not so good". As before, we increment the effective modem count on each channel that belongs to the RCS. The resulting channel load profiles are as follows:
Option 1—RCS (modem 2) is assigned channels 2-9:

| Channel number        | 1 | 2 | 3 | 4 | 5 | 6 | 7 | 8 | 9 | 10 |
|---|---|---|---|---|---|---|---|---|---|---|
| Effective Modem count | 1 | 2 | 2 | 2 | 2 | 2 | 2 | 2 | 1 | 0 |

Option 2—RCS (modem 2) is assigned channels 3-10:

| Channel number        | 1 | 2 | 3 | 4 | 5 | 6 | 7 | 8 | 9 | 10 |
|---|---|---|---|---|---|---|---|---|---|---|
| Effective Modem count | 1 | 1 | 2 | 2 | 2 | 2 | 2 | 2 | 1 | 1 |

Figure 3:
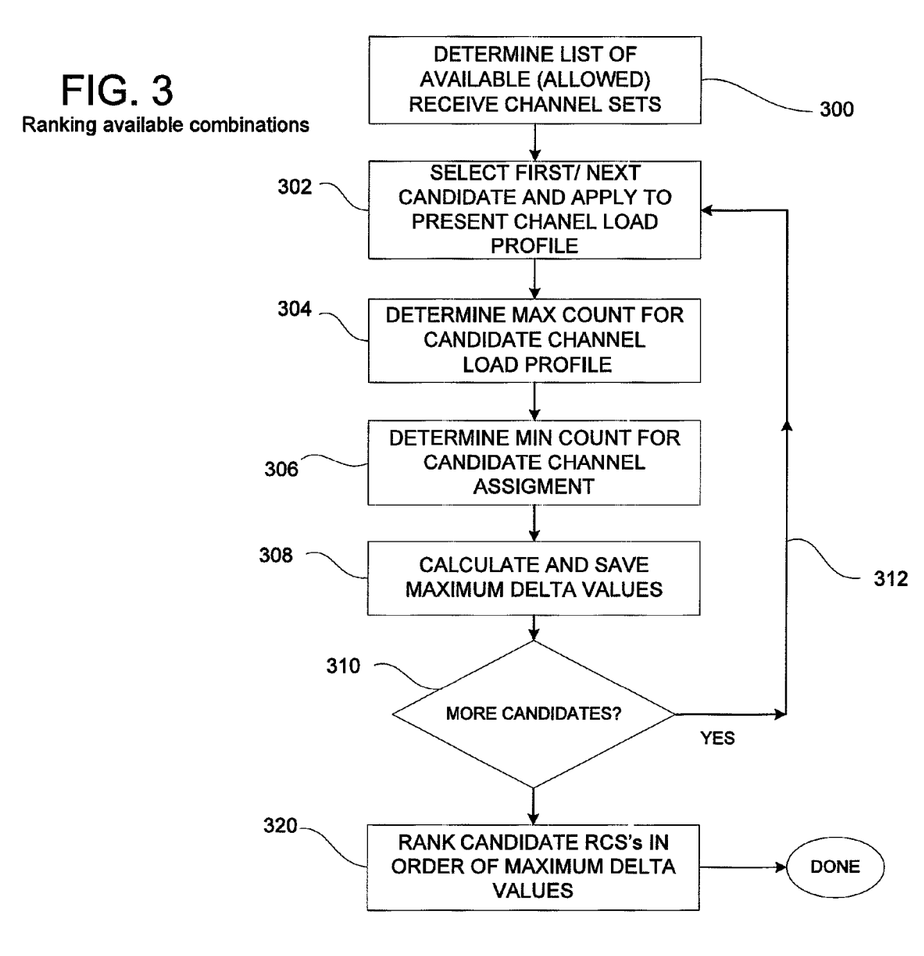
FIG. 3 is a simplified flow diagram illustrating an embodiment of a modem count based method for load balancing in connection with channel assignments to a CM.

Intuitively, option 2 seems more balanced. Next we explain how to make that determination objectively. One measure would be the standard deviation which happens to be 0.69 for option 1 and 0.51 for option 2. This represents one embodiment. However, for performance reasons it's not our most preferred solution. We have found it sufficient to choose option 2 because it "minimizes the maximum delta between channels". In this solution, we can rank the options by the following process, illustrated in FIG. 3:

Initially, we determine a list of the allowed RCSs, block 300. We select a first candidate RCS and apply it to the current channel load profile as explained above, block 302, as if that RCS were being assigned to the modem. Next, find the maximal_channel_count across all channels for the candidate channel load profile, block 304 (in the example, this value is 2 for both option 1 and option 2). Next, find the minimal_channel_count across all channels, block 306, for the same load profile (in the example, this value is 0 for option 1 and 1 for option 2). Next, calculate the maximum difference or "delta" between channels, block 308, and store them. In the example above, this metric value is 2 for option 1, and equals 1 for Option 2. At decision 310, the illustrative flow checks for more candidates, and if there are more candidate RCSs the process loops at 312. After the list of candidates is exhausted, we can rank the candidate RCSs according to the corresponding maximum delta values, block 320. The lowest maximum delta value is the "best" (most balanced) solution. Accordingly, to minimize the maximum delta metric, the balancing algorithm should select option 2 as the preferred (more load balanced) assignment profile for modem 2.

In a simple case, the CMTS may select an RCS based solely on load balancing (MCB-LB) as described. A straightforward RCS assignment algorithm may be to start with (first assign) the channels that have the lowest modem count. In the example above, we would start with channels 9 and 10 because they have a 0 count, and then select an additional 6 from channels 1-8. This simple approach would avoid having to cycle through the ranking algorithm described above because it will automatically pick the best solution. However, it requires dynamically creating arbitrary channel sets.

In practice, there are actually only a limited set of RCSs available to a given modem. This has to do with the physical capabilities of the modem (transceivers, etc.) as well as some administrative constraints (placed in order to limit the number of RCSs that have to be managed). The modem advertises its capabilities in the registration request, in the form of a Receive Channel Profile (RCP, See 188 in FIG. 1). Consequently, in some embodiments, it may be preferable to rank the available or allowed RCSs, based on their effective modem counts, and choose the best (most balanced) solution. This corresponds to block 300 in FIG. 3.

At first glance, it may appear that searching through RCSs would require additional CPU processing as it involves looping through all possibilities, however there are ways to execute this very quickly. In one embodiment, the process may update a variable, "count per RCS" i.e., the effective modem count summed over the channels assigned in an RCS, each time a modem registers, and then use indexing (instead of sorting) to rank it. See block 220 in FIG. 2.

In some systems, the actual RCS as advertised in the RCP might be smaller than the physical modem capability, as some channels might be "hijacked" for out-of-band IPTV control and not visible to DOCSIS (a.k.a the bypass architecture). In such a configuration, for example, a 4-channel modem that has 2 channels dedicated to IPTV will appear as a 2-channel modem to the CMTS. Further, in some systems, an operator may only offer, say a 4-channel RCS operation, even though the CM might advertise a greater number, e.g., an 8-channel RCP. Embodiments of the present disclosure may be applied to all of these situations.

Normalized Modem Count

Once a DOCSIS 3.0 modem starts sending/receiving data, it can do so on multiple channels. Here we refer to channel switching rather than channel bonding. The DOCSIS 3.0 scheduler is smart enough to divert traffic, at packet rate, to the least busy channels. In effect the scheduler load balances the traffic across channels at packet rate (without regard to individual CMs), but of course it is constrained by the modem physical capabilities: An 8-channel modem can balance traffic across 8 channels, while a 4-channel modem has only 4 channels to choose from.

Consequently, in practice, it may not be optimal to increase the effective modem count on a channel by one, when the channel is assigned to a modem, regardless of the capabilities of that modem. In some cases, it may be preferable to normalize the "weight" of a modem on a channel based on the modem capabilities. One solution is to assign a fraction of the number of channels supported by the modem to each channel. For example, an 8-channel cable modem would contribute ⅛ to each channel in its RCS, while a 4-channel cable modem would contribute ¼, etc. In an actual implementation in a CMTS, it may be preferable to normalize these weight values to integer values. So, for example, the effective modems counts might be scaled in one embodiment to 8 for a single-channel CM, 4 for a 4-channel CM, and 1 for an 8-channel CM. In general, then, the "weight" of each modem, for our "modem counting" purposes, would be inversely related to the number of channels in the RCS (which may be less than the total physical channels in some cases as noted). Normalized modem counts may be used in the processes illustrated in FIGS. 2-4.

Modem count based load balancing in a preferred embodiment is compatible with the bonding group selection process and the general DOCSIS 3.0 framework described in "10.2.6.2.1 Channel Assignment During Registration" and related sections (DOCSIS MULPI I10). In this regard, the DOCSIS specifications separate the DOCSIS 3.0 channel assignment from assignments to modems not operating in Multiple Receive Channel (MRC) mode (generally pre-3.0 modems and/or 3.0 modems that have MRC disabled). In an embodiment, a CMTS implementation may address both types of channel assignments (i.e. both types of GM's) as part of the same flow.

Impact of Modem Registration Order

As outlined in the previous sections, there are at least two options for implementing MCB-LB:
1. Determine which are the least busy channels and dynamically create an RCS to match them, and register the modem on this newly-created RCS.
2. Have a list of RCSs and choose the RCS with the lowest channel count.

A presently preferred embodiment employs option (2). We have discovered that the order in which the modems register affects load balancing. While not mathematically proven, it appears that the worst-case condition occurs when the modems with the fewest channels register first; and, conversely, the best case is where the modems with the fewest channels register last.

To illustrate, assume a system with:
total of 5-QAMs
10 modems that are 4 channel capable
10 modems that are single channel capable
Single channel modems can register anywhere.
4 channel modems can register only on RCS made out of Q1, Q2, Q3, Q4.

First, we assume that the single channel modems register first. As the system would balance them we would get a count of:

| Channel number | 1 | 2 | 3 | 4 | 5 |
|---|---|---|---|---|---|
| Modem count | 2 | 2 | 2 | 2 | 2 |

Now the 4-channel modem register, and since they have to go on Q1, Q2, Q3, Q4 (the only RCS) the count we will get is:

| Channel number | 1 | 2 | 3 | 4 | 5 |
|---|---|---|---|---|---|
| Modem count | 12 | 12 | 12 | 12 | 2 |

The result is that Q5 is clearly unbalanced.

Next we assume the 4-channel modems register first. The count is going to be:

| Channel number | 1 | 2 | 3 | 4 | 5 |
|---|---|---|---|---|---|
| Modem count | 10 | 10 | 10 | 10 | 0 |

Then, after the single-channel modems register, the count will be:

| Channel number | 1 | 2 | 3 | 4 | 5 |
|---|---|---|---|---|---|
| Modem count | 10 | 10 | 10 | 10 | 10 |

This load profile is well balanced (that is, with the "unnormalized" balance).

Alternatively, if the system can create RCSs on the fly, then the order or registration does not matter. If the single-channel modems register, the profile becomes:

| Channel number | 1 | 2 | 3 | 4 | 5 |
|---|---|---|---|---|---|
| Modem count | 2 | 2 | 2 | 2 | 2 |

Next we track how the first 3 modems with 4 channels register. Here, new RCSs can be created, so the 4-channel modems are not restricted as before to Q1, Q2, Q3, Q4. They can use any of the five channels. So, the modem count after adding a first 4-channel modem is:

| Channel number | 1 | 2 | 3 | 4 | 5 |
|---|---|---|---|---|---|
| Modem count | 3 | 3 | 3 | 3 | 2 |

$2^{nd}$ modem uses a different RCS, namely Q1, Q2, Q3, Q5:

| Channel number | 1 | 2 | 3 | 4 | 5 |
|---|---|---|---|---|---|
| Modem count | 4 | 4 | 4 | 3 | 3 |

3$^{rd}$ modem (yet another RCS):

| Channel number | 1 | 2 | 3 | 4 | 5 |
|---|---|---|---|---|---|
| Modem count | 5 | 5 | 4 | 4 | 4 |

And by the 10$^{th}$ modem the count will be:

| Channel number | 1 | 2 | 3 | 4 | 5 |
|---|---|---|---|---|---|
| Modem count | 10 | 10 | 10 | 10 | 10 |

What is clear from these examples is that when the RCSs are limited, they have to be balanced. If they are not balanced then the order of registration makes a substantial difference in load balancing. The order does not matter if arbitrary RCSs can be created as needed for load balancing (consistent with the RCPs). To illustrate, we next examine the effect of adding just one more RCS for the 4-channel modem. That RCS can be Q2, Q3, Q4, Q5. In that case, the worst case (single channel modems register first) load profile would be the following:

| Channel number | 1 | 2 | 3 | 4 | 5 |
|---|---|---|---|---|---|
| Modem count | 7 | 12 | 12 | 12 | 7 |

And that could be further improved by adding another RCS of Q1, Q2, Q4, Q5.

Figure 4:
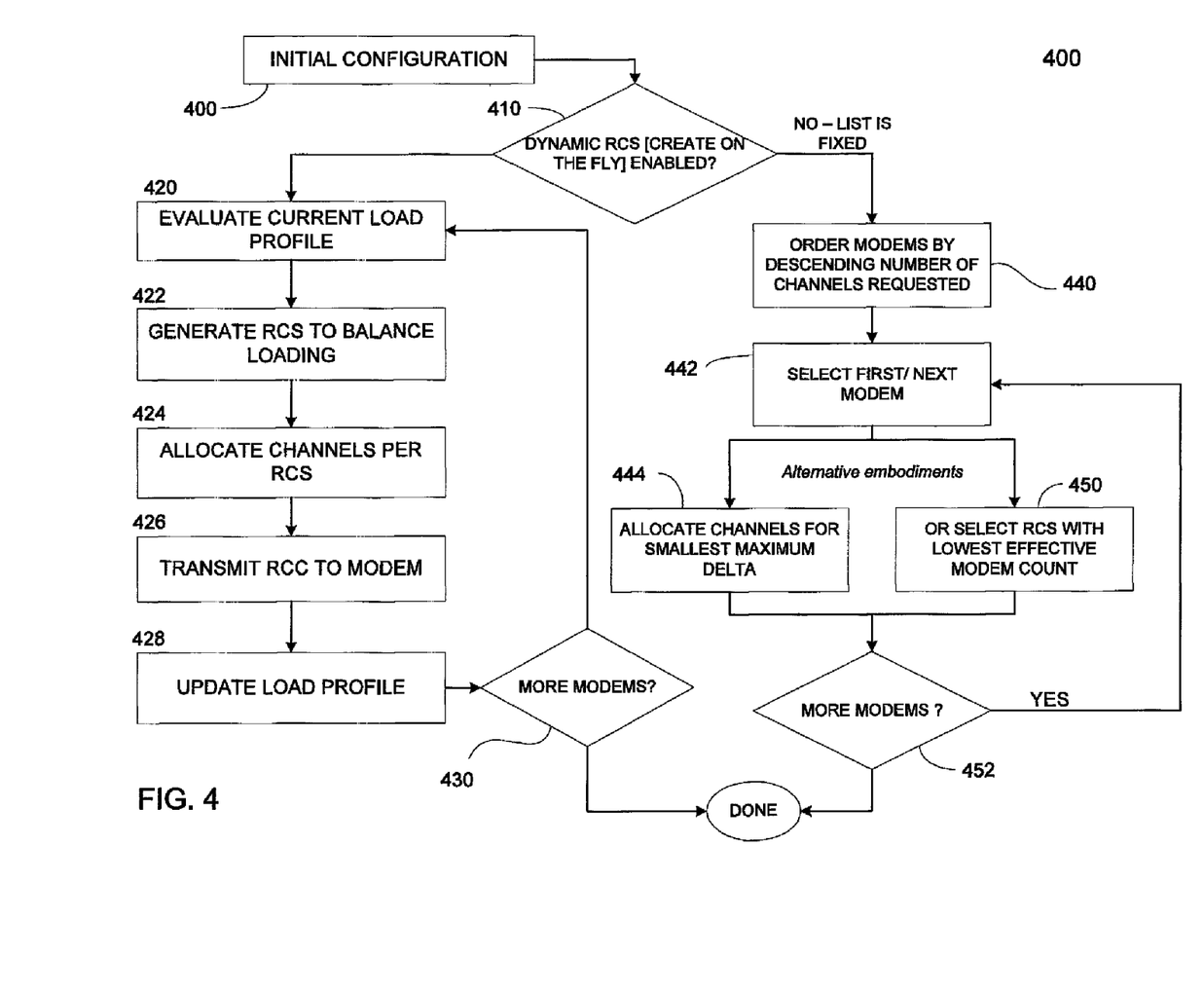
FIG. 4 is a simplified flow diagram illustrating alternative processes for load balancing.

FIG. 4 is a simplified flow diagram illustrating some of the features described above. After initialization, block 400, the processes depends on whether or not dynamic RCSs are implemented. If so, the process may proceed to inspect the current load profile, block 420, and generate an RCS to best balance the loading, block 422. Then channels are allocated to the current modem, block 424, in accordance with that generated channel set. The configuration is transmitted to the modem, block 426, and the load profile is updated, block 428. This process loops, via decision 430, for registration of further pending modem requests.

Alternatively, where the set of permitted RCSs is fixed, the process calls for ordering the modem requests in descending order of the number of channels requested, block 440. Thus, the modem requesting the most channels will register first. In block 442, the first modem on the list is selected. Next, in one alternative, block 444, channels are allocated (a permitted RCS is selected) based on the smallest maximum delta solution. The solutions may have been ranked using a process like that of FIG. 3. In another alternative, block 450, the RCS having the lowest effective modem count is selected. This process then loops via decision 452 for registration of remaining modem requests.

We have also discovered a further optimization to the described methodology. That is, where the modem counts are equal, is it preferred to choose the channels that are shared with the fewest number of RCSs first in making the next assignment. This refinement may not make a huge difference in some cases, but it does not make sense to "waste" a flexible QAM if a more restricted QAM ("restricted" in terms of how many RCCs use it) is available.

Estimating the Quality of the Load Balance

Since we do have a dependency in one embodiment on the order in which the modems register, and since the modems registers in a random order in a real system, it is important to estimate how bad the load balance is. This can be done in at least two ways:

An offline tool can be used to evaluate the best RCC definitions to minimize the impact of ordering. Once a well-balanced definition of RCCs is found ordering should not be a problem. In one embodiment, a CMTS may run a periodic task that calculates the worst case (in terms of ordering) and alerts the user in the event that a random order of registration resulted in modem load balancing that is close to the worst case. In that event, a user may choose to add RCCs so that a more balanced solution can be found.

Show Commands

In an embodiment, for example in CMTS software, a user interface exposes the MCB-LB implementation logic, and how it ranks the various solutions. For example, "show commands" may be implemented that display the data that the CMTS is using for MCB-LB. The show command may display one or more of the following information:

the per-channel weight the CMTS assigned for each modem type
the modem count per channel
the normalized modem count per channel
the max/min of the normalized modem count The show command may also print an "unbalanced" warning if any of the following is true:

total modem count is below a predetermined threshold, or
min/max of the modem count exceeds a predetermined threshold Re-Distribution after Failure As explained above, modem count based load balancing generally distributes the modems fairly across available channels as they register. However, consider the following scenario:

1. A channel or groups of channels fail because of a planned (administrative shutdown) or unplanned event.
2. While some modems may continue to operate in partial mode, some may re-register because of the failure and get re-assigned to the channels that are still active.
3. When the failed channels become operational again, the modems don't re-register and the system is unbalanced.

Unfortunately, an algorithm to re-balance the modems without causing major disruptions to the modems that don't need to be re-balanced could be fairly complex. One example may involve the following steps:

1. Logically re-registering all the modems to come up with a well distributed count.
2. In theory only a subset of modems need to be moved to get the optimal count, but considering that some may have registered after the failure and some operate in partial mode, its simpler to just move all of them.
3. use DBC to move the modems around to fit the optimal count while taking into account that as long as this mass DBC is taking place the system may not be balanced.

Other solution solutions may exist, but are likely to add complexity. In short, the current recommendation is that the system can detect a case where modems are unbalanced (an in the case above it will be obvious as some channels will have 0 or very low modem count so the mix/max (delta) would be large). It can send an SNMP trap to alert the operator, and the operator may choose to manually intervene to re-balance the modems, for example, by re-setting the MAC domain (shut/no shut) to force all modems to re-register.

Hardware and Software

Several examples have been described above with reference to the accompanying drawings. Various other examples of the disclosure are also possible and practical. The system may be exemplified in many different forms and should not be construed as being limited to the examples set forth above. The system described above can use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, aspects of the disclosure may be implemented in a digital computing system, for example a CPU or similar processor in a CMTS. More specifically, by the term "digital computing system," we mean any system that includes at least one digital processor and associated memory, wherein the digital processor can execute instructions or "code" stored in that memory. (The memory may store data as well.)

A digital processor includes but is not limited to a microprocessor, multi-core processor, DSP (digital signal processor), GPU, processor array, network processor, etc. A digital processor (or many of them) may be embedded into an integrated circuit. In other arrangements, one or more processors may be deployed on a circuit board (motherboard, daughter board, rack blade, etc.). Aspects of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example RAM or FLASH memory embedded in an integrated circuit CPU, network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, the present disclosure may be implemented or embodied in computer software (also known as a "computer program" or "code"; we use these terms interchangeably). Programs, or code, are most useful when stored in a digital memory that can be read by one or more digital processors. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated the principles of the disclosure in a preferred embodiment thereof, it should be apparent that the disclosure may be modified in arrangement and detail without departing from such principles. We claim all modifications and variations coming within the spirit and scope of the following claims.

The invention claimed is:

1. A Cable Modem Termination System (CMTS) comprising:
    a network interface for sending and receiving data to and from a network;
    RF interfaces to implement RF channels for communications between the CMTS and at least one cable modem;
    registration logic for assigning selected RF channels to a requesting modem for communications between the CMTS and the modem; and
    load balancing logic associated with the registration logic for selecting the RF channels to assign to the requesting modem so as to balance loading across the RF channels based on a modem count heuristic,
wherein:
    the CMTS is configured to maintain a channel load profile in memory for use by the load balancing logic, the channel load profile storing an effective modem count for each channel; and
    the modem count heuristic implements a relative weight of each modem, for determining the effective modem count, the relative weight being inversely related to the number of channels supported by the modem.

2. A CMTS according to claim 1 wherein the load balancing logic selects a channel set to assign to the requesting modem by identifying a channel set that minimizes a maximum delta metric between channels in the load profile, wherein the delta value is defined as the difference between the highest and lowest modem counts per channel in the channel load profile.

3. A CMTS according to claim 2 wherein the selected channel set is a receive channel set.

4. A CMTS according to claim 2 wherein the selected channel set is a transmit channel set.

5. A Cable Modem Termination System (CMTS) comprising:
    a network interface for sending and receiving data to and from a network;
    RF interfaces to implement RF channels for communications between the CMTS and at least one cable modem;
    registration logic for assigning selected RF channels to a requesting modem for communications between the CMTS and the modem; and
    load balancing logic associated with the registration logic for selecting the RF channels to assign to the requesting modem so as to balance loading across the RF channels based on a modem count heuristic;

wherein the CMTS is configured to maintain a channel load profile in memory for use by the load balancing logic, the channel load profile storing an effective modem count for each channel;

the modem count heuristic implements a relative weight of each modem, for determining the effective modem count, the relative weight being inversely related to the number of channels supported by the modem; and wherein the load balancing logic determines a standard deviation of the effective modem counts in the channel load profile, and selects a channel assignment allocation that minimizes standard deviation value for the resulting channel load profile.

6. A processor-implemented method for load balancing in a cable network, comprising:

receiving registration requests from a plurality of cable modems, each request including a receive channel profile for the corresponding modem;

selecting a first one of the requesting modems that has the highest number of receive channels in the corresponding profile;

assigning the requested number of receive channels to the selected modem consistent with that modem's receive channel profile;

selecting a next one of the remaining requesting modems that has a highest number of receive channels in the corresponding profile;

assigning the requested number of receive channels to the next selected modem consistent with that modem's receive channel profile; and repeating the steps of selecting a next modem, and assigning receive channels to the selected modem, so that the requesting modems are registered sequentially, from those having the most channels registered first to those having the fewest channels registered last.

7. A processor-implemented method according to claim 6 and further comprising:

for each requesting modem, formulating a list of candidate receive channel sets (RCSs) consistent with the corresponding modem receive channel profile;

ranking the candidate RCSs based on a maximum delta metric of the effect of each RCS as applied to a current channel load profile; and assigning the receive channels to each modem responsive to the ranking of the corresponding candidate RCSs.

8. A processor-implemented method according to claim 6 and further comprising selecting an RCS that has the lowest current weighted modem count for assigning channels to the requesting modem.

9. A processor-implemented method according to claim 8 and further comprising, where the weighted modem counts are equal, choosing the channels that are shared with the fewest number of receive channel sets first in making the next assignment.

10. A processor-implemented method according to claim 6 and further comprising normalizing the modem count per channel responsive to a total number of supported channels for each modem.

11. A processor-implemented method according to claim 6 and further comprising:

maintaining in memory a current load profile;

updating the current load profile after each assignment of an RCS to a modem; and issuing a notification if the current load profile indicates a loading imbalance.

12. A processor-implemented method for load balancing across the downstream channels of a CMTS comprising the steps of:

receiving a registration request in a CMTS from a cable modem, the registration request including a receive channel profile indicating a number of channels available on the modem for downstream traffic flow;

accessing a current channel load profile of the CMTS stored in memory, the channel load profile indicating a current number of modems per channel already assigned to each downstream channel of the CMTS;

assigning downstream channels to the requesting modem consistent with the receive channel profile and selected to balance a modem count across the downstream channels of the CMTS;

updating the channel load profile of the CMTS to reflect the new channel assignments; and normalizing the modem count per channel in the current load profile responsive to a total number of supported channels for each modem.

13. A method according to claim 12 including selecting the channel set by identifying a channel set that minimizes a maximum delta metric between channels in the load profile, wherein the delta value is defined as the difference between the highest and lowest modem counts per channel in the load profile.

14. A processor-implemented method for load balancing across the downstream channels of a CMTS comprising the steps of:

receiving a registration request in a CMTS from a cable modem, the registration request including a receive channel profile indicating a number of channels available on the modem for downstream traffic flow;

accessing a current channel load profile of the CMTS stored in memory, the channel load profile indicating a current number of modems per channel already assigned to each downstream channel of the CMTS;

assigning downstream channels to the requesting modem consistent with the receive channel profile and selected to balance a modem count across the downstream channels of the CMTS;

updating the channel load profile of the CMTS to reflect the new channel assignments;

selecting the channel set by identifying a channel set that minimizes a maximum delta metric between channels in the load profile, wherein the delta value is defined as the difference between the highest and lowest modem counts per channel in the load profile; and ranking RCS solutions by:

selecting a candidate RCS;

incrementing the modem count on each channel in the load profile that belongs to the candidate RCS;

finding the maximal channel count across all channels in the load profile;

finding the minimal channel count across all channels in the load profile;

calculating the largest difference or delta among the channel counts;

storing the largest delta metric for the candidate RCS;

repeating the foregoing steps to evaluate other candidate RCS solutions and determine their respective largest delta metrics;

ranking the candidate RCSs according to their respective maximum delta metrics; and storing an indication of the rankings in memory for use in subsequent channel assignments.

15. A method according to claim 14 and further including:
   detecting when the current channel load profile is unbalanced relative to a predetermined metric; and
   transmitting a warning to an operator that the system is unbalanced.

16. A method according to claim 15 wherein the unbalanced metric is responsive to the largest delta in the load profile exceeding a predetermined maximum.

17. A method according to claim 15 wherein the unbalanced metric is responsive to a modem count falling below a predetermined threshold count per channel.

18. A method according to claim 14 and further including:
   responsive to a predetermined balancing show command, generating a display for an operator display screen including the per-channel weight the CMTS assigned for each modem type, the modem count per channel, the normalized modem count per channel, and the max/min of the normalized modem count.

\* \* \* \* \*